No. 669,352. Patented Mar. 5, 1901.
A. SCHOLZEN.
WHEEL.
(Application filed Nov. 19, 1900.)
(No Model.)
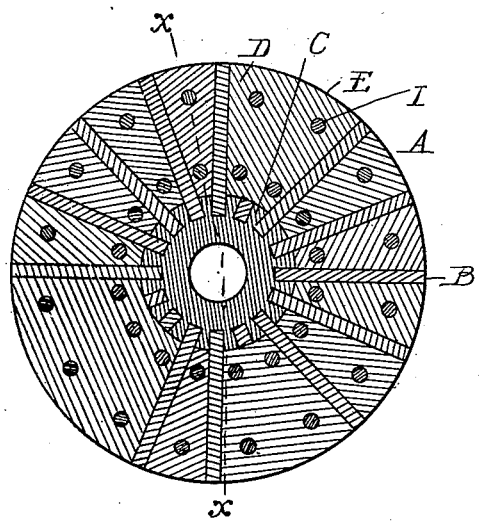
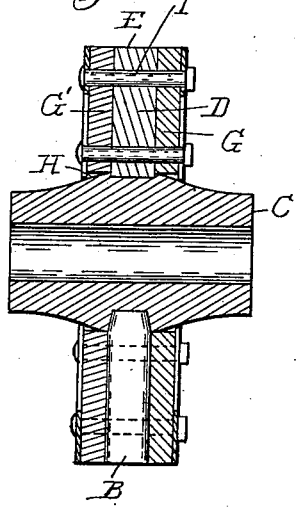
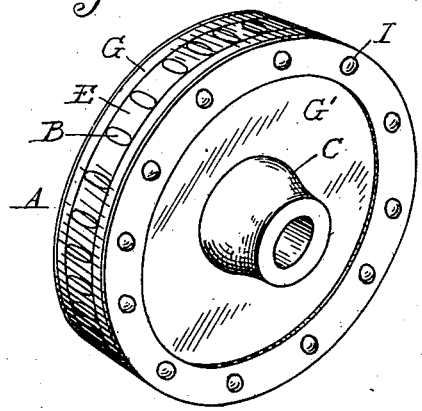
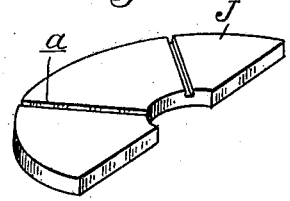
Witnesses
Inventor
Anton Scholzen
By
Attys

UNITED STATES PATENT OFFICE.

ANTON SCHOLZEN, OF HOLLOWAY, MICHIGAN.

WHEEL.

SPECIFICATION forming part of Letters Patent No. 669,352, dated March 5, 1901.

Application filed November 19, 1900. Serial No. 37,009. (No model.)

*To all whom it may concern:*

Be it known that I, ANTON SCHOLZEN, a citizen of the United States, residing at Holloway, in the county of Lenawee and State of Michigan, have invented certain new and useful Improvements in Wheels, of which the following is a specification, reference being had therein to the accompanying drawings.

The invention relates to a low wheel adapted for use in connection with stone-boats or similar vehicles designed for carrying heavy loads; and the object of the present invention is to form a wheel of this type from a worn and discarded vehicle-wheel of ordinary construction.

In the drawings, Figure 1 is a perspective view of the finished wheel embodying my invention. Fig. 2 is a vertical central section therethrough. Fig. 3 is a section taken on line $xx$, Fig. 2. Fig. 4 is a detached perspective view of one of the wedge-shaped blocks, and Fig. 5 is a modified form of clamping-disk.

In the construction of the low wheel referred to I employ an ordinary wagon-wheel which has been discarded as unfit for use in its original form. The wheel-felly I remove and shorten the spokes uniformly to form a low wheel of the desired diameter.

In the drawings, A designates an ordinary wagon-wheel, the spokes B of which have been sawed off to produce a wheel of the desired size, as shown.

C designates the usual hub from which the spokes radiate. Between each adjoining pair of spokes I place a filling D in the form of a wedge-shaped block, the small end of which is adapted to rest upon the wheel-hub between the spokes and the larger end to extend outwardly to the spoke ends, as shown. I also slightly curve the outer end E of the block and groove the opposite sides of the latter, as at F, so as to permit of the block conforming to the external contour of the spokes.

G G' designate two disks, each centrally apertured, as at H, and of such diameter as to extend from the hub upon which they are sleeved to the wheel periphery, as plainly indicated in Fig. 3. These clamping-disks, arranged upon opposite sides of the spokes and filling-blocks, are secured to each other and to the blocks by means of clamping-bolts, such as I, which extend through the blocks and disks and are secured in place, as indicated in the figure last referred to.

In cases where the spokes of the worn wheel are out of alinement or the wheel is generally out of true I employ clamping-disks forming complementary sections, such as J, Fig. 5, each section being provided with radial grooves $a$, extending partly through the members, as shown. As thus formed the disks may be bent while being clamped in place, and thus compensate for any irregularities in the outline of the wheel.

In Fig. 2 the vehicle-wheel from which the low wheel is formed is shown as having several spokes missing. In such cases some of the filling-blocks, while of similar form, are considerably larger than the others to compensate for the missing spokes.

From the construction of the wheel as set forth it will be obvious that a low wheel is formed of sufficient strength to be used in connection with vehicles of the type referred to. Furthermore, the usual hub and spokes of a discarded wheel being employed the expense of forming the low wheel is exceedingly slight.

What I claim as my invention is—

1. In a wheel, the combination with the hub having spokes radiating therefrom, of a plurality of independent filling-blocks interposed between adjoining pairs of spokes and extending from the hub to the extreme outer ends of said spokes, independent clamping-disks sleeved upon the hub upon opposite sides of the spokes, said disks corresponding in diameter to the diameter of the wheel, and connections between said disks and filling-blocks, substantially as described.

2. In a wheel, the combination with the hub having spokes radiating therefrom of wedge-shaped filling-blocks interposed between adjoining pairs of spokes, each block extending from the hub to the spoke ends and having its opposite edges grooved to conform to the external contour of the spokes, centrally-apertured clamping-disks sleeved upon the hub upon opposite sides of the spokes and blocks and extending to the wheel periphery, and clamping-bolts extending through the filling-blocks and disks in the manner and for the purpose set forth.

3. In a wheel, the combination with the hub having spokes radiating therefrom, of wedge-shaped filling-blocks interposed between adjoining pairs of spokes, each block extending from the hub to the spoke ends and having its opposite edges grooved to conform to the external contour of the spokes, centrally-apertured clamping-disks sleeved upon the hub upon opposite sides of the spokes, each disk comprising two complementary sections radially grooved for the purpose set forth, and clamping-bolts extending through the filling-blocks and disks, substantially as described.

In testimony whereof I affix my signature in presence of two witnesses.

ANTON SCHOLZEN.

Witnesses:
THOMAS E. GAHAGAN,
HENRY COMAN.